Figure 1:
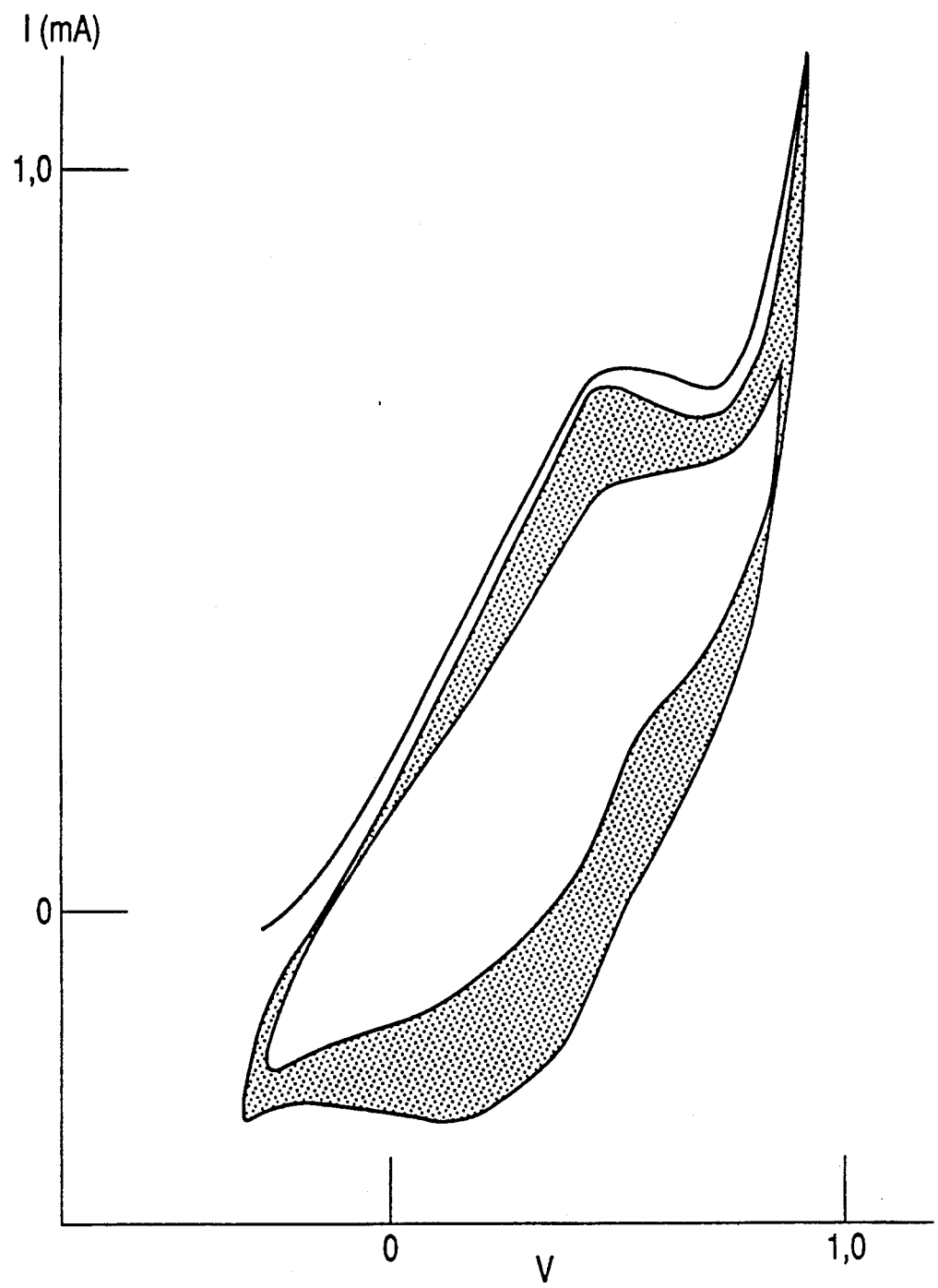

United States Patent [19]

Billaud et al.

[11] Patent Number: 5,290,891

[45] Date of Patent: Mar. 1, 1994

[54] PROCESS FOR THE PREPARATION OF POLYINDOLES, ELECTROCONDUCTIVE COMPOSITIONS AND DEVICES CONTAINING THEM AND APPLICATIONS OF THE POLYINDOLES

[75] Inventors: Denis Billaud, Nancy, France; Etienne Hannecart, Tervuren; Claude Franquinet, Brussels, both of Belgium

[73] Assignee: Solvay (Société Anonyme), Brussels, Belgium

[21] Appl. No.: 868,796

[22] Filed: Apr. 16, 1992

[30] Foreign Application Priority Data

Apr. 16, 1991 [BE] Belgium .............................. 09100350

[51] Int. Cl.$^5$ .......................................... C08F 134/00
[52] U.S. Cl. ........................................ 526/259; 526/91; 526/93
[58] Field of Search ...................... 526/91, 93, 259

[56] References Cited

U.S. PATENT DOCUMENTS

| | | | |
|---|---|---|---|
| 4,488,943 | 12/1984 | Skotheim | 205/157 X |
| 4,640,749 | 2/1987 | Naarmann et al. | 526/259 X |
| 4,728,399 | 3/1988 | Moehwald | 205/188 |
| 5,135,618 | 8/1992 | Saiki et al. | 205/171 |

FOREIGN PATENT DOCUMENTS

| | | |
|---|---|---|
| 0336468 | 10/1989 | European Pat. Off. . |
| 0350083 | 1/1990 | European Pat. Off. . |
| 1000679 | 8/1965 | United Kingdom . |
| 9001919 | 3/1990 | World Int. Prop. O. . |

OTHER PUBLICATIONS

R. T. Morrison and R. N. Boyd "Organic Chemistry" 3rd ed. Allyn and Bacon, Boston, 1973. 1004–1006.
H. Bennett, ed., Concise Chemical and Technical Dictionary, 2d Ed. Chem. Pub. Co., N.Y., 1962, p. 745.
Ullmann's Encyclopedia of Industrial Chemistry, 5th ed., vol. A21 p. 437 VCH, 1992.
Youmans, H. L. et al. (1976) J. Heterocyclic Chem. 13, 949 "Rates and Mechanisms of Indole and 3-Methylindole Polymerization in Cation Resins Exchange Beads".
Chemical Abstracts, vol. 101, No. 14, Oct. 1, 1984, p. 3, resume No. 111446y, Columbus, OH, US; R. J. Waltman et al.: "Substituent effects in . . . "; & J. Phys. Chem. 1984, 88(19), 4343–6.
Chemical Abstracts, vol. 114, No. 6, Feb. 11, 1991, p. 2, resume No. 43606s, Columbus, OH, US; C. H. Hamann et al.: "Electropolymerization of . . . "; & Dechema Monogr. 1990, 121 (Werkst. Elektrochem.), 297–309.

Primary Examiner—Joseph L. Schofer
Assistant Examiner—Mark Nagumo
Attorney, Agent, or Firm—Spencer, Frank & Schneider

[57] ABSTRACT

The invention relates to a process for the preparation of polymers based on polyindoles by chemical polymerization of indole in the presence of an oxidizing agent and of a solvent.

The invention also relates to compositions and electroconductive devices containing the polyindoles thus obtained and to the use of the polymers obtained.

5 Claims, 3 Drawing Sheets

PROCESS FOR THE PREPARATION OF POLYINDOLES, ELECTROCONDUCTIVE COMPOSITIONS AND DEVICES CONTAINING THEM AND APPLICATIONS OF THE POLYINDOLES

The present invention relates to a process for the preparation of polymers based on polyindoles by chemical polymerisation of indole. The invention also relates to electroconductive compositions and devices containing the polyindoles thus obtained and to the applications of these polyindoles.

A process for the preparation of aromatic polymers by chemical polymerisation in the presence of Friedel-Crafts catalysts, such as ferric chloride, at a temperature of between 100° and 800° C. has been proposed in Belgian Patent 646,441. The polymers obtained by this process have relatively low conductivities of between $10^{-10}$ and $10^{-0.5}$ siemens per cm. The production of polymers having high electrical conductivity properties remains a problem to date.

A process for the preparation of polyindoles by chemical polymerisation of indole has now been found which enables homogeneous conductive polymers having high electrical conductivity properties and satisfactory thermal stability to be obtained with a high degree of conversion. The polyindoles thus obtained also have particular cyclability properties. Moreover, they are easy to use.

To this end, the present invention relates to a process for the preparation of polymers based on polyindoles by chemical polymerisation of indole in a reaction mixture comprising at least one oxidising agent and one solvent for indole.

One or more organic solvents are used as the solvent for indole in the reaction mixture. Usually, the organic solvent used is an alkyl halide, an alcohol, an ether, an aromatic compound, such as benzene, a nitrile or a mixture of these compounds. Preferably, acetonitrile, an alkyl halide comprising from 1 to 10 carbon atoms, such as, in particular, a straight-chain or branched alkyl halide containing from 1 to 8 carbon atoms, the halide being a chloride, a bromide or a fluoride, or a mixture of two or more of these compounds is used. Particularly preferentially, acetonitrile or a straight-chain alkyl chloride containing from 1 to 4 carbon atoms is used. Very particularly preferentially, acetonitrile, chloroform or methylene chloride is used. Good results have been obtained with chloroform and with acetonitrile.

The amount of solvent used in the process according to the invention is greater than 2 ml per g of indole. The amount of solvent used is less than 500 ml per g of indole. The amount of solvent is generally from 3 to 400 ml per g of indole, usually from 5 to 200 ml per g of indole and preferably from 10 to 100 ml per g of indole.

The oxidising agent used in the reaction mixture is an organic or inorganic ferric salt, an organic or inorganic copper salt, hydrogen peroxide, an oxide or an oxidising salt of a metal of groups VB, VIB, VIIB or VIII of the periodic table of the elements, or a mixture of these. Usually, an inorganic ferric salt, such as a chloride, a sulphate or a nitrate, an inorganic copper salt, such as a chloride, a sulphate or a nitrate, or a mixture of these is used. Preferably, a ferric chloride or a cupric chloride is used. Good results have been obtained with anhydrous ferric chloride and anhydrous cupric chloride. The best results have been obtained with anhydrous ferric chloride.

The molar ratio of oxidising agent to indole used in the process according to the invention is generally from 1 to 15. Usually, this ratio is from 1.5 to 10 and preferably from 2 to 6.

It is possible to carry out the process according to the invention in the absence of water. However, from the standpoint of the conductivity of the polymer obtained, the process is advantageously carried out in a reaction mixture containing water. The amount of water introduced into the reaction mixture is generally greater than 0.01 ml per g of indole. The amount of water introduced into the reaction mixture is generally less than 20 ml per g of indole. Usually, it is between 0.05 and 10 ml per g of indole. Preferably, it is between 0.1 and 5 ml per g of indole.

Generally, the process is carried out in a reaction mixture which has an acidic pH. Usually, the process is carried out in a reaction mixture which has a pH of less than 3. Preferably, the process is carried out in a reaction mixture which has a pH of less than or equal to 2.

It is possible to carry out the process according to the invention in the absence of acid. However, the addition of acid to the reaction mixture promotes the process according to the invention, in particular when the oxidising agent used is not of an acid nature. Generally, an acid oxidising agent or an oxidising agent to which an acid is added is used; thus, when the oxidising agent is acid, such as ferric chloride, it is not necessary to add an acid. Usually, the acid used is HCl, $H_2SO_4$, $H_3PO_4$, $HClO_4$ or $HNO_3$. Preferably HCl or $H_2SO_4$ is used. Good results have been obtained with hydrochloric acid.

The amount of acid introduced into the reaction mixture with a view to obtaining the desired pH depends on the nature and on the amount of oxidising agent used and also on the nature of the acid used.

The process is usually carried out under an air, argon or nitrogen atmosphere and preferably under a nitrogen atmosphere.

The temperature at which the process according to the invention is carried out is an important parameter for the process according to the invention. The temperature at which the process according to the invention is carried out is generally between $-20°$ and $90°$ C., usually between $0°$ and $60°$ C. and preferably between $5°$ and $40°$ C. when working at atmospheric pressure. Good results have been obtained between $10°$ and $25°$ C.

The pressure at which the process is carried out is generally between 0.1 and $10 \times 10^5$ Pa and is preferably atmospheric pressure.

The process according to the invention may advantageously be carried out by following the following steps:

during a first step, a fraction of the necessary amount of solvent and oxidising agent is introduced into the reactor under a nitrogen atmosphere;

during a second step, indole, dissolved in the supplementary amount of solvent, is added, with stirring, in order to obtain the polymer;

during a third step, the polymer obtained is separated off, washed and then dried.

During this process it is advantageous to introduce the indole dissolved in the solvent in a continuous and regular manner.

The process according to the invention may also be carried out by following the following steps:

during a first step, indole dissolved in the necessary amount of solvent is introduced into the reactor, with stirring;

during a second step, the supplementary amount of solvent and the oxidising agent are added, under a nitrogen atmosphere, in order to obtain the polymer;

during a third step, the polymer obtained is separated off, washed and then dried.

Water and/or the acid are introduced, if appropriate, before or during the introduction of indole into the reactor.

During the third step the polymer is separated off by filtration, washed with water or acetonitrile, preferably with water, and then dried.

The process according to the invention may be carried out in any apparatus or any reactor enabling the operating conditions described above to be combined.

The polyindoles obtained may be dedoped in a manner known to those skilled in the art. These dedoped polymers may be dissolved easily, such as, in particular, in tetrahydrofuran, and deposited as very thin layers of the order of a μm or in the form of films 0.2 to a few tens of microns thick on diverse supports, such as glasses, polymers, metals, textiles, plastic materials and metal-treated glasses. The conductive films obtained are adherent, homogeneous and highly conductive.

The polyindoles obtained may also easily be dispersed in diverse polymer resins and easily used. In fact, the polyindoles and their mixtures with thermoplastic polymers, such as polyvinyl chloride or polyethylene in particular, may be milled and hot-stamped in order to obtain composite sheets or articles. These composite sheets or articles have a good mechanical strength and are homogeneous, smooth and rigid. These composite sheets or articles may be used in particular during the production of electromagnetic shielding.

The composite sheets or articles may be filled with diverse fillers, such as glass fibres, carbon black, calcium carbonate or metal particles.

The invention therefore also relates to compositions comprising one or more polyindoles and one or more thermoplastic polymers, as well as the electroconductive devices comprising these compositions. The thermoplastic polymers which have given good results are polyvinyl chloride and polyethylene. These compositions are obtained by mixing the polyindole or polyindoles with one or more thermoplastic polymers.

The polyindoles and the compositions comprising the polyindoles according to the invention may be used for their electrical conductivity, electromagnetic absorption and thermal conductivity properties and more particularly for the production of electroconductive devices.

The polyindoles according to the invention have an entirely surprising set of properties, which are, in the main:

an exceptional reversibility and stability of the redox cycle between the oxidised and reduced forms, a surprising cyclability, significant absorptions in the range of electromagnetic radiation, and a significant variation in the spectral characteristics obtained with a low variation in potential, which makes it worthwhile and economical to use them as electrochromic material.

These surprising properties of the polymers make them particularly usable for the production of electroconductive devices, the principle of which is based on these properties and which are also a subject of the present invention.

The following may be mentioned as nonlimiting examples of electroconductive devices containing polyindoles according to the invention:

electrodes, electromagnetic shielding, and electrochromic devices based on the modification of the optical spectrum of the said polymers depending on their electrochemical state, which is manifested during oxidation and reduction cycles of the polymer films deposited on the anodes (or on the cathodes) of these devices during charging and discharging; examples of such electrochromic devices which may be mentioned are display screens, optoelectronic devices and optical memories and commutators.

The invention is illustrated by the following examples.

EXAMPLE 1

The reactor used is a 4-necked 500 ml round-bottom flask; the first neck is provided with a 3-way tap, the second with a thermometer, the third with a 250 ml reservoir which has a tap and is surmounted by a 3-way tap and the fourth with a septum allowing insertion of a needle connected to a 50 ml metering syringe.

This round-bottom flask, which is provided with a stirrer, is placed in a thermostatic bath and purged by a cycle comprising placing under vacuum 3 times and rinsing 3 times with pure and dry nitrogen.

180 ml of chloroform, previously degassed with nitrogen, are introduced into this round-bottom flask, which is kept at 15° C. under nitrogen, and 25 g of anhydrous ferric chloride are then added, with stirring. The metering syringe is then filled with 5 ml of demineralised and degassed water and the reservoir with a tap is filled with 20 ml of chloroform and 3.6 g of degassed indole.

The water, using the syringe, and the chloroform and indole, using the reservoir with a tap, are then introduced in parallel into the round-bottom flask in the course of 10 minutes. The molar ratio of ferric chloride to indole is 5.

The round-bottom flask is then kept at 15° C. for 5 hours, with stirring; the pH of the reaction mixture is 1.

50 ml of water are then introduced into the round-bottom flask, which is kept at 15° C., in the course of 45 minutes.

The product, which at this stage is in the form of a suspension, is filtered under air at 20° C.

The product obtained is washed 4 times with 100 ml of water at 20° C. and then dried overnight under vacuum at 20° C. under 2670 Pa.

3.75 g of a brown powder are obtained.

This powder is pressed at 20° C. for a few minutes under a pressure of $19.6 \times 10^7$ Pa. The platelet obtained has a conductivity of $1.5 \times 10^{-1}$ siemens per cm.

The degree of conversion, calculated as being the ratio of the nondoped polymer obtained to the monomer used, is about 90%.

EXAMPLE 2

The product obtained after filtration in Example 1 is washed twice with 100 ml of water at 20° C. and then treated with 250 ml of NaOH for 30 minutes.

The product is then washed 3 times with 200 ml of water.

The washed product is filtered off under air at 20° C. and then dried overnight under vacuum at 20° C. and under 2670 Pa.

A dedoped polyindole powder is obtained.

4 g of this powder are dissolved in 100 ml of tetrahydrofuran. The solution is stirred for 1 hour at ambient temperature.

The solution is then centrifuged at 10,000 revolutions per minute for 10 minutes.

A plate of conductive glass [ITO (indium tin oxide) glass or glass covered with a 1000 Å deposit of gold 14 by 8 cm in size] is then covered with the solution obtained. The plate covered in this way is centrifuged on a plate whirler (250 revolutions per minute for 1 minute).

The plate is then dried at 20° C. for 10 minutes under about 1335 Pa.

A polyindole layer is obtained which is very uniform and homogeneous and of the order of 0.5 μm.

1 cm$^2$ of the plate thus obtained, said plate being covered with gold and polyindole, is used as an electrode. The counterelectrode is a platinum wire and the reference electrode is a KCl-saturated calomel electrode (SCE).

The electrolyte is a solution of $LiClO_4$ (0.3M) in water. About 25 ml of electrolyte are used.

The polyindole is subjected to redox cycling between $-0.28$ and $+0.87$ V against the SCE; the electrochemical properties of the polyindole were determined from the cyclic voltammogram recorded using a PAR model 173 potentiostat and from the recorded intensity peaks.

FIG. 1 shows the initial cyclovoltammograms of the electrochemical system. Start-up required a preliminary activation of several cycles. The scanning rate is 20 mV/s.

Figure 2:
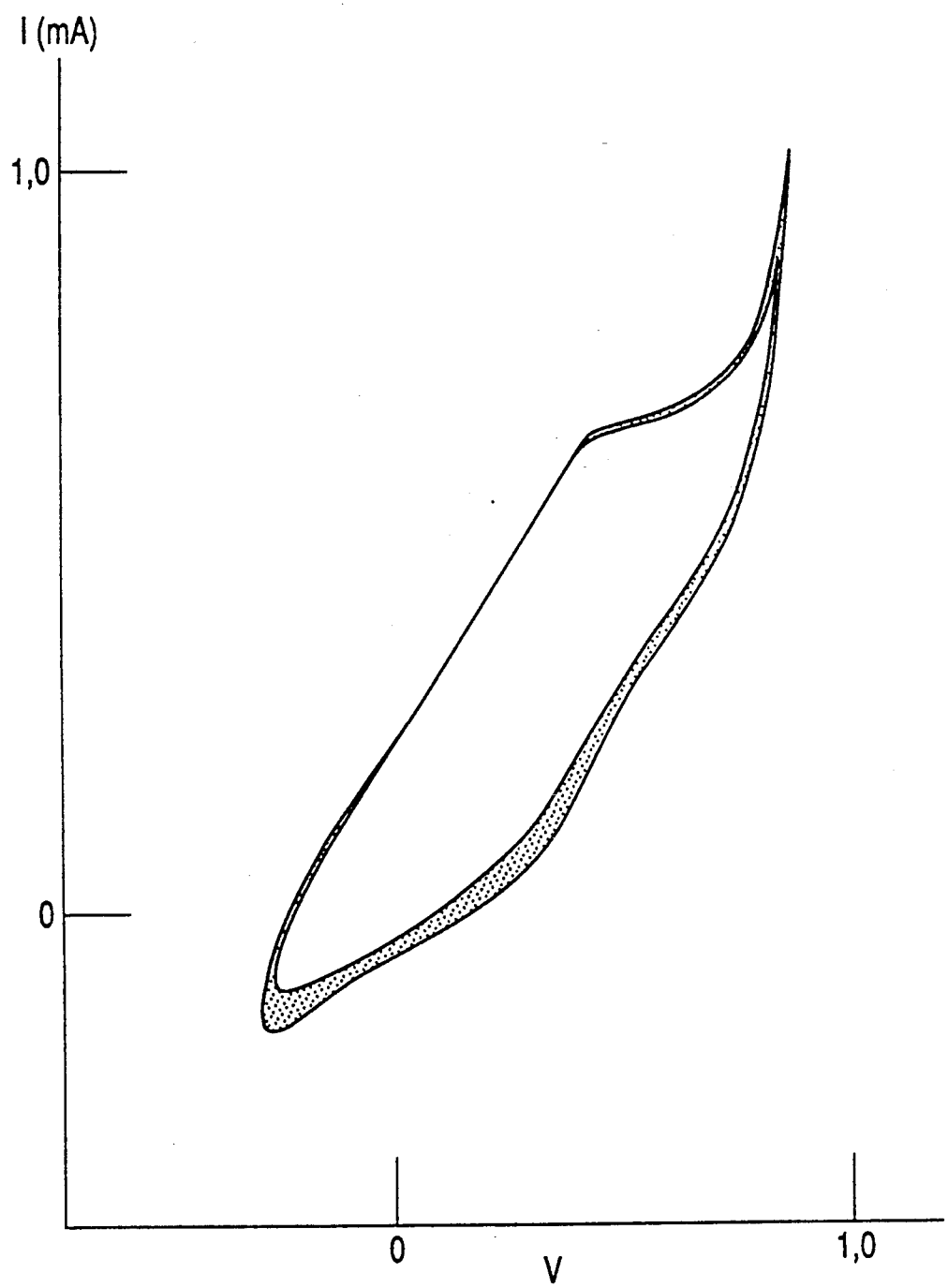

FIG. 2 shows the voltammograms obtained after 120,000 cycles. The scanning rate is 20 mV/s. The main characteristics of these cycles are retained: conversion potential close to 400 mV; close anodic and cathodic peaks (195 mV approximately).

Figure 3:
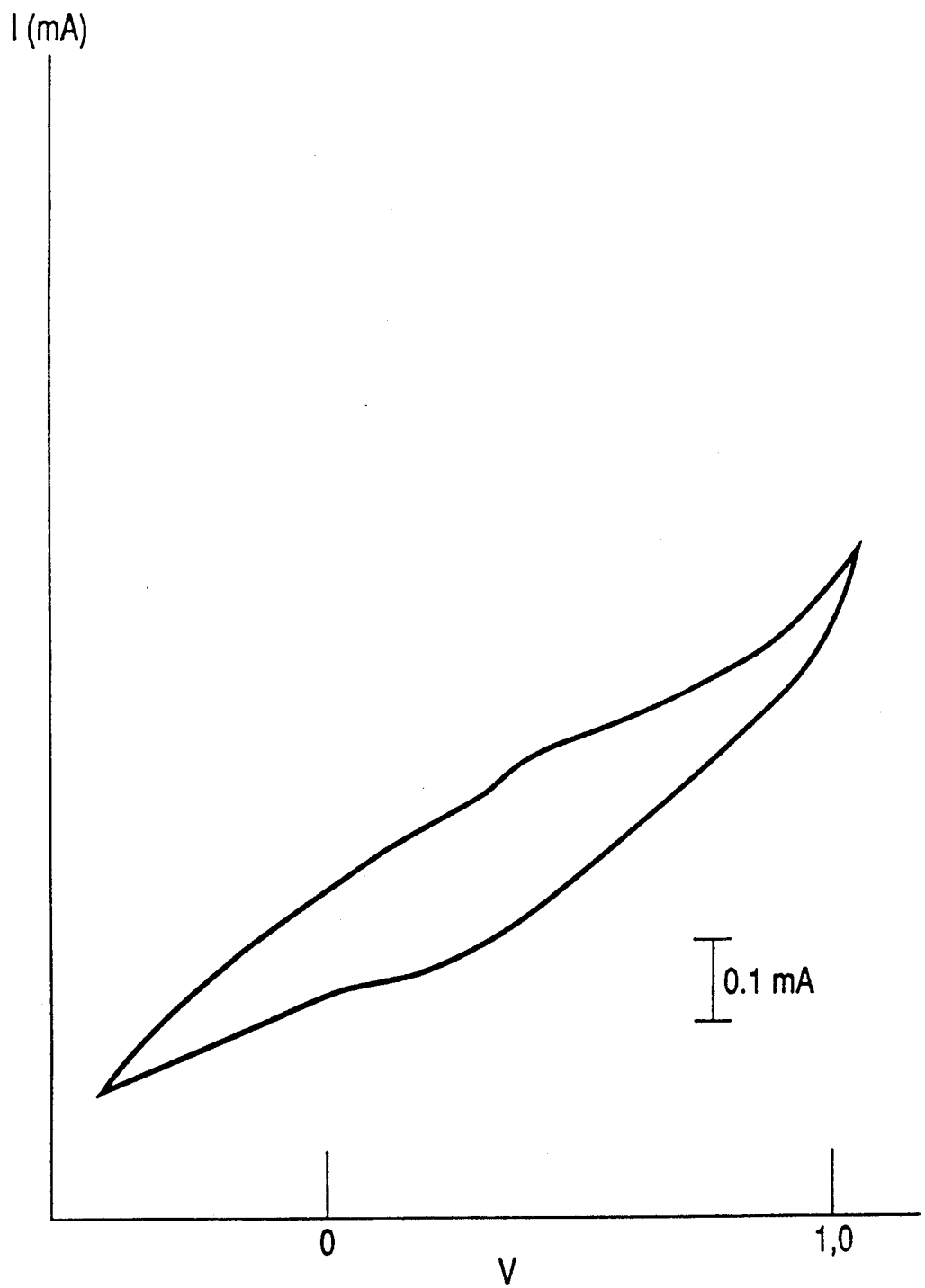

FIG. 3 shows the voltammogram recorded at 20 mV/s at the end of 250,000 cycles. The cycling speed was raised to 500 mV/s between 120,000 and 250,000 cycles.

The abscissa unit is the volt (V in volts against SCE) and the ordinate unit is the microampere (I in mA).

EXAMPLE 3

180 ml of acetonitrile and 10.3 g of anhydrous $CuCl_2$ (0.076 mol) are introduced under a nitrogen atmosphere at ambient temperature into a reactor identical to that described in Example 1.

The metering syringe is then filled with 2 ml of demineralised and degassed water and the reservoir with a tap is then filled with 20 ml of acetonitrile and 3.6 g of degassed indole (0.03 mol).

The water, using the syringe, and the acetonitrile and indole, using the reservoir with a tap, are introduced into the round-bottom flask in parallel in the course of 10 minutes. The molar ratio of $CuCl_2$ to indole is 2.5.

The round-bottom flask is then kept at 20° C. for 5 hours, with stirring; the pH of the reaction mixture is 2.

The product is then filtered off under air at 20° C.

The product obtained is washed 4 times with 100 ml of water at 20° C. and then dried overnight under vacuum at 20° C. under 2670 Pa. 2.4 g of a brown powder are obtained.

This powder is pressed at 20° C. for a few minutes under a pressure of $19.6 \times 10^7$ Pa. The platelet obtained has a conductivity of $2 \times 10^{-2}$ siemens per cm.

The degree of conversion, calculated as being the ratio of the nondoped polymer obtained to the monomer used, is about 60%.

EXAMPLE 4

Polyethylene [PE sold under the name ELTEX B 5920 and having a density of 0.950 g/cm$^3$ at 20° C. and a HLMI (High Load Merck Index) of 10 g/10 minutes] is mixed with the polyindole obtained in Example 1 in the proportions by weight listed in Table 1.

Each mixture is milled for 3 minutes at 150° C. and then introduced into a press, where it is subjected to stamping at 150° C. for 1 minute under a pressure of $9.8 \times 10^7$ Pa.

The conductivity results for the sheets obtained are listed in Table 1.

The sheets are conductive, homogeneous, smooth and rigid.

TABLE 1

| Ratio by weight | | Sheet |
|---|---|---|
| Polyindole | Polyethylene | Conductivity S/cm |
| 70 | 30 | $0.6 \times 10^{-2}$ |
| 50 | 50 | $1 \times 10^{-3}$ |
| 30 | 70 | $2 \times 10^{-4}$ |
| 10 | 90 | $1 \times 10^{-4}$ |

We claim:

1. A process for the preparation of polyindole, comprising:
   chemically polymerizing indole at a temperature between about 10° C. and 25° C. in an acidic reaction mixture comprising one organic solvent and further consisting of one oxidizing agent to prepare polyindole, and
   separating said polyindole from said reaction mixture.

2. The process according to claim 1, wherein the reaction mixture also comprises water.

3. The process according to claim 2, wherein the amount of water introduced into the reaction mixture is between about 0.05 and 10 ml per gram of indole.

4. The process according to claim 2, wherein the amount of water introduced into the reaction mixture is between about 0.1 and 5 ml per gram of indole.

5. The process according to claim 1, wherein the solvent used is chloroform or acetonitrile.

* * * * *